UNITED STATES PATENT OFFICE.

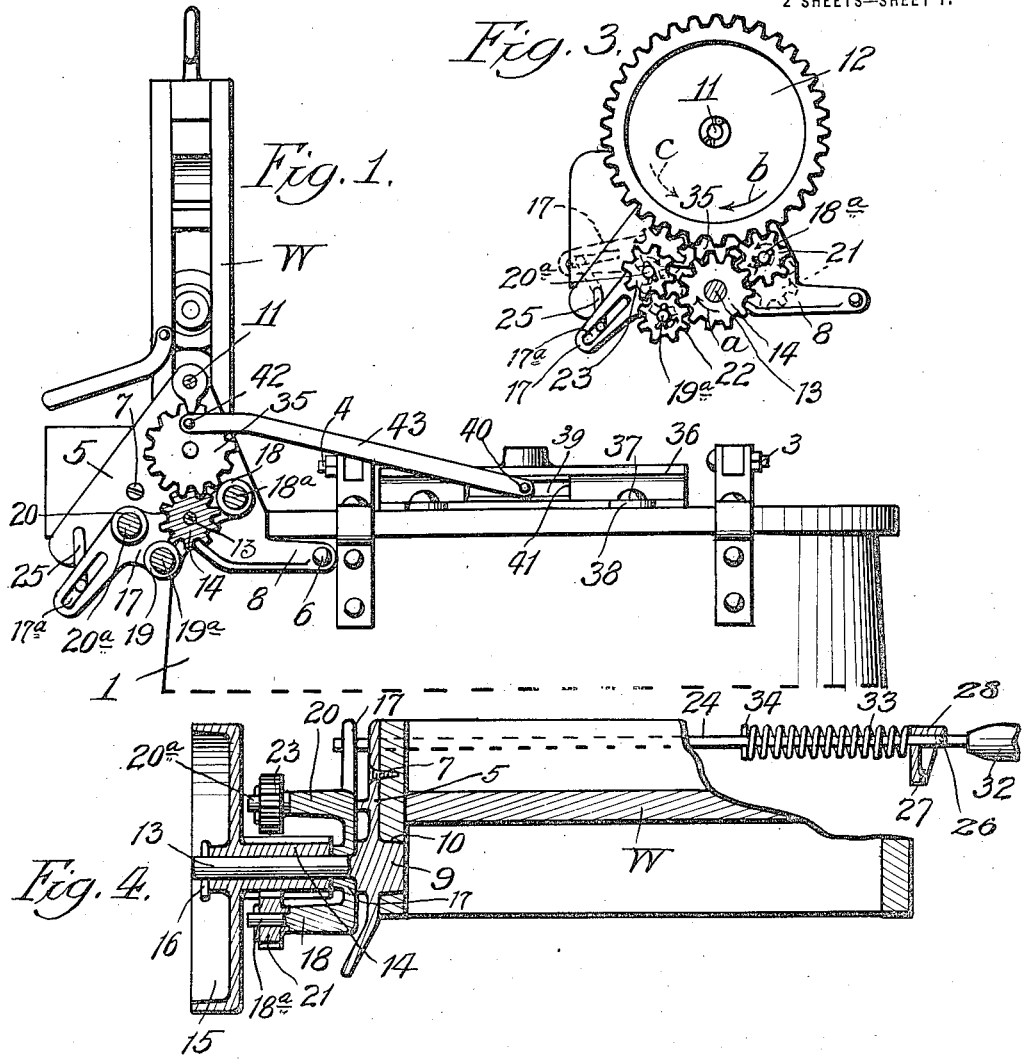

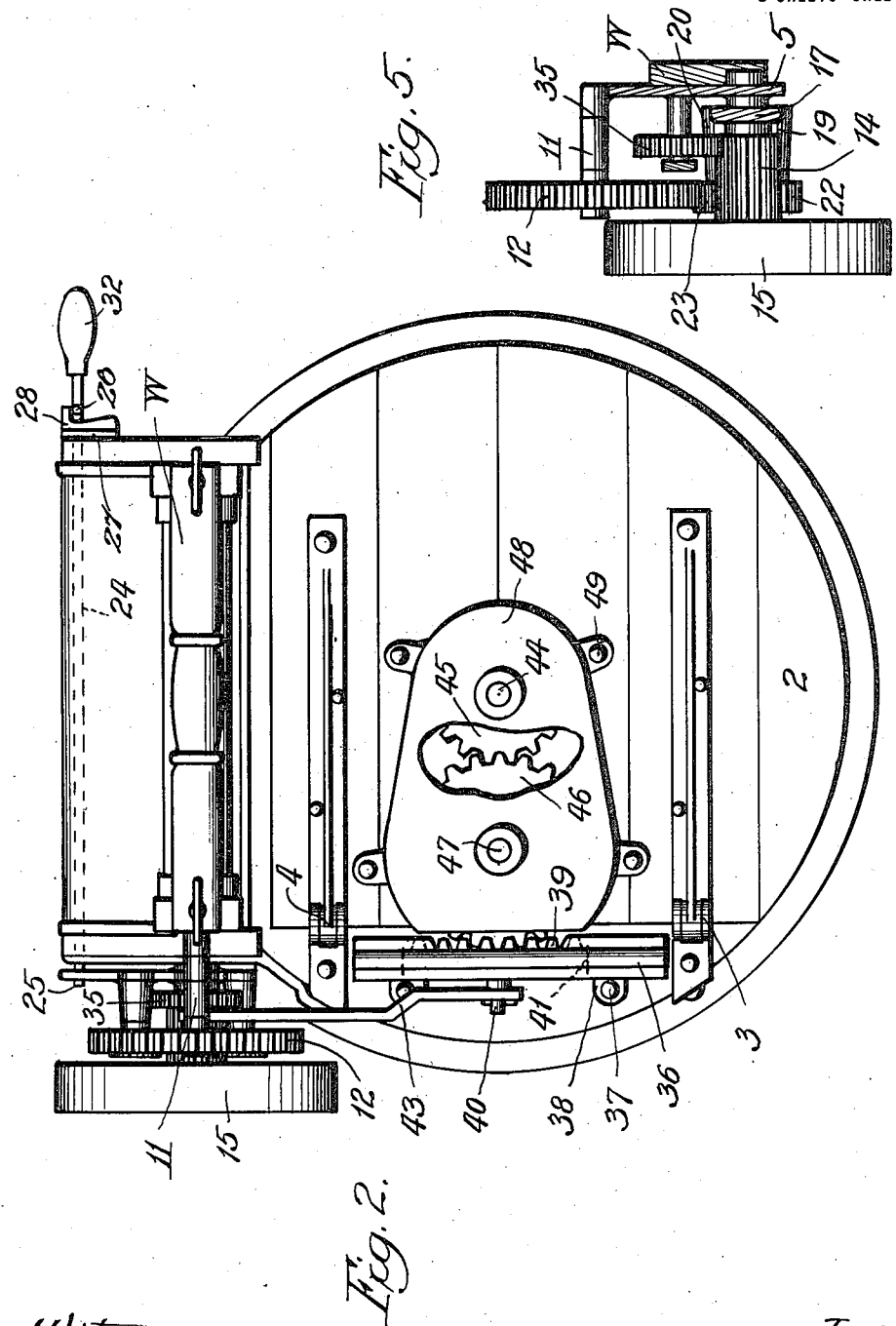

WILLIAM H. GEORGE, OF DEXTER, IOWA, ASSIGNOR TO DEXTER MANUFACTURING COMPANY, A CORPORATION OF IOWA.

GEAR MECHANISM.

1,174,849.  Specification of Letters Patent.  Patented Mar. 7, 1916.

Application filed July 29, 1911. Serial No. 641,358.

*To all whom it may concern:*

Be it known that I, WILLIAM H. GEORGE, a citizen of the United States, and residing at Dexter, in the county of Dallas and State of Iowa, have invented a new and useful Improvement in Gear Mechanisms, of which the following is a specification.

My invention relates to gear mechanisms for transmitting mechanical motion from a power member to an operating member.

The gear mechanism of my invention comprises means for readily reversing the operative connection between a suitable power member and a suitable operating member or shaft, so that the latter may be rotated in either direction while the power member is rotated continuously in the same direction. When the gear mechanism of my invention is applied to a washing machine, the operating shaft is the wringer shaft, and the reversible connection is used for reversing the operation of the wringer. As my invention is particularly applicable to washing machines and like devices, I have, for the sake of illustration, elected to show and describe my invention in connection with a washing machine. It is to be understood, however, that I do not intend to limit my invention to such use.

In the accompanying drawings, Figure 1 is a side view showing the upper portion of a washing machine tub with the gear mechanism of my invention applied thereto, Fig. 2 is a plan view of Fig. 1, Fig. 3 is a detached elevational view of my improved gear mechanism, the power pulley being for the sake of clearness omitted, Fig. 4 shows a plan view in cross-section of certain parts of my invention, Fig. 5 is a view at right angles to Fig. 3 looking toward the left of this figure, the power pulley being shown in Fig. 5, and Fig. 6 is a detached view showing the recessed locking plate for yieldably holding the operating crank shaft in adjusted position.

The different parts comprising the gear mechanism of my invention are mounted on a suitable support 1 which is shown in the drawings in the form of a washing machine tub provided with a hinged cover 2. The hinge connections between the cover and the tub are indicated at 3 and 4. To the support 1 is rigidly secured the frame-work indicated as a whole by W, which is shown in the drawing as a suitable form of wringer mechanism. As this wringer mechanism may be of any improved construction, no further description thereof is thought to be necessary. A metal bracket 5 is rigidly connected to the support 1 and frame-work W by suitable fastening devices, such as screws or bolts 6 and 7. As illustrated in the drawing, the bolt 6 passes through the extension 8 of the bracket and through the support 1. The screw 7 passes into the wood-work of the frame W, as best shown in Fig. 4. As an additional means for rigidly holding the frame 5 in place, the frame may be provided with a boss 9 which fits snugly into an opening 10 provided for that purpose on the frame-work W. The frame-work W carries the horizontal shaft 11 on which one of the wringer rolls is mounted. One end of this shaft extends beyond the frame-work W, and has fixed thereto the gear 12, which is adapted to be engaged by one or the other of a pair of adjustable transmission pinions to reverse the operation of the shaft 11, as will presently be explained.

From the bracket 5 extends the horizontal bearing pin or stud 13, on which is journaled the power pinion 14. In the particular embodiment illustrated, the power pinion is cast integral with the power pulley 15, but these two members may be formed separately and rigidly secured together by suitable means. A cotter pin 16, or other equivalent device, holds the members 14 and 15 against longitudinal movement on the bearing pin 13. A frame 17 is pivoted on the bearing pin 13 in the space between the inner end of the power pinion 14 and the body of the frame 5, as best shown in Fig. 4. The frame 17 is provided with three horizontally extending arms 18, 19 and 20, which terminate in bearing studs 18ª, 19ª and 20ª, respectively. On the bearing stud 18ª is journaled a transmission pinion 21; on the bearing stud 19ª is journaled a transmission pinion 22, and on the bearing stud 20ª is journaled the transmission pinion 23. Cotter pins, or other suitable means, hold the transmission pinions against longitudinal movement on their respective bearing studs. As best seen from Fig. 3, the pinions 21 and 22 are continuously in mesh with the power pinion 14. As the frame 17 rocks about an axis co-incident with the axis of rotation of the power pinion 14, the driving connection between the power pinion and the transmission pinions 21 and 22 is not broken, no matter in what position the frame 17 is adjusted. It will also be observed that the pinion 23 is permanently in mesh with the pinion 22, but out of mesh with the power pinion 14. It will thus be seen that the pinions 21 and 23 are connected with the power pinion 14 so as to respectively be capable of driving the gear 12 in a counter-clockwise direction and in a clockwise direction. Assuming the latter to rotate continuously in a clock-wise direction, as indicated by the arrow *a* in Fig. 3, the pinion 21 will rotate in a counter-clockwise direction, while the pinion 23 will rotate in the same direction as the power pinion. The pinions 21 and 23 are so arranged with respect to the gear 12 that either one or the other may be brought into mesh with this gear.

When the frame 17 is in the position indicated in full lines in Fig. 3, the shaft 11 is driven from the power pinion 14 through the transmission pinion 21 in the direction indicated by the arrow *b*. When the frame 17 is rocked into the position indicated in dotted lines in Fig. 3, the pinion 21 is rocked out of mesh with the gear 12, and the pinion 23 rocked into mesh with this gear, with the result that the gear 12 now rotates counter-clockwise, as indicated by the dotted arrow *c*. It will thus be clear that, by simply rocking the frame 17 through a small angle in one direction or the other, the shaft 11 is rotated in either direction, as desired, while the power pinion 14 continues to rotate in one and the same direction.

To operate the frame 17, I have provided a crank shaft 24 having a crank arm 25 at one end and a crank arm 26 at the other end. The crank arm 25 is arranged to engage at its free end in the slot 17ᵃ of the frame 17. By means of this slotted connection between the crank shaft 24 and the frame 17, it is obvious that the frame may be rocked into any desired position by simply turning the crank shaft the proper amount. There are three positions into which the frame 17 may be rocked. The first position is that shown in full lines in Fig. 3 to rotate the shaft 11 in one direction. The third position is that indicated in dotted lines in Fig. 3 to cause rotation of the shaft 11 in the reverse direction. The second position of the frame 17 is intermediate between the first and third positions, and may be called the inoperative position, because both of the pinions 21 and 23 are then out of mesh with the gear 12. Therefore, when the frame 17 is in its second or inoperative position, there is no driving connection between the power pinion 14 and the shaft 11. In order to hold the crank shaft 24 in any one of its adjusted positions, I provide a locking plate 27 at the outer end of the frame-work W. This plate has an annular flange 28 on which are formed the three locking shoulders 29, 30 and 31. When the crank arm 26 abuts against the locking shoulder 29, the shaft 11 is connected to rotate in one direction. When the arm 26 abuts against the stop shoulder 30, the shaft 11 is connected to rotate in the reverse direction; and when the arm 26 abuts against the stop shoulder 31, the shaft 11 is entirely disconnected from the power pinion 14. A suitable handle 32 is provided at the outer end of the crank shaft 24 to facilitate the operation thereof. A spring 33 is coiled about the crank shaft 24, abutting at one end against the plate 27 and at the other end against the transverse pin 34 on the shaft 24. This spring tends to move the shaft toward the left, as viewed in Fig. 4, and thereby holds the crank arm 26 against the stop shoulders of the locking plate 27. It is evident that other suitable means may be used for yieldably locking the crank shaft 24 in adjusted position.

On the bracket 5 is journaled the crank gear 35, which is permanently in mesh with the power pinion 14. On top of the support 1 is rigidly fixed a guide frame 36 by means of bolts or screws 37, passing through lugs 38 on the guide-frame. In this guide-frame operates a rack bar 39, which is provided with a transverse pin 40 extending through the slot 41 in the guide-frame 36, as best shown in Fig. 1. The crank gear 35 is provided with a pin 42 for receiving one end of the connecting link 43, the other end of which is connected to the pin 40 of the rack bar. It will thus be seen that the continuous rotation of the power pinion 14 causes the rack bar 39 to reciprocate. A vertical operating shaft 44 is rotatably suspended from the top of the support 1, and has fixed to its upper end the horizontal gear 45. In the embodiment shown in the drawings, the vertical shaft 44 is the agitator shaft of the washing machine, and extends into the tub. Connection between the gear 45 and the rack bar 39 is established by the horizontal gear 46, which is pivoted at 47 to the top or cover of the support 1. The gears 45 and 46 are preferably inclosed in a casing 48 secured to the top of the support 1 by screws or bolts 49. From the above connection between the power pinion 14 and the vertical shaft 44, it will be clear that continuous rotation of the pinion 14 causes the shaft 44 to oscillate. The power pulley 15 is adapted to be connected with any suitable source of power, such as an electric motor or a gas engine.

Having thus described my invention, what I claim as new and desire to secure by Letters Patent of the United States is:

In a gear mechanism, the combination of a suitable support, a stud carried by the support, a power pinion mounted to turn on said stud, a driven shaft, a gear fixed on said shaft, a frame pivotally mounted on said stud, a first pinion on said frame driven from said power pinion, a second pinion on said frame meshing with said power pinion, a third pinion on said frame meshing with the second pinion, the pivotal mounting of the frame permitting its adjustment so that either the first or third pinion of the frame may mesh with said gear one at a time, said first, second and third pinions being mounted directly on studs extending from said frame, and a power-transmission member mounted on said first stud beyond the power pinion and extending across the studs mounting the first, second and third pinions to prevent displacement of the first, second and third pinions.

In witness whereof, I hereunto subscribe my name this 26th day of July A. D. 1911.

WILLIAM H. GEORGE.

Witnesses:
J. H. TODD,
M. S. WHITZEL.